(12) United States Patent
Thompson

(10) Patent No.: US 7,854,817 B2
(45) Date of Patent: Dec. 21, 2010

(54) METHODS AND ASSEMBLIES FOR ATTACHING ARTICLES TO SURFACES

(75) Inventor: Craig Thompson, Inver Grove Heights, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 321 days.

(21) Appl. No.: 12/129,175

(22) Filed: May 29, 2008

(65) Prior Publication Data

US 2009/0294034 A1   Dec. 3, 2009

(51) Int. Cl.
*B29C 65/48* (2006.01)
(52) U.S. Cl. .................................... 156/196
(58) Field of Classification Search ............... 156/196, 156/443
See application file for complete search history.

(56) References Cited

U.S. PATENT DOCUMENTS

| | | | |
|---|---|---|---|
| 4,024,312 A | 5/1977 | Korpman | |
| 4,990,399 A | 2/1991 | Hoopengardner | |
| 5,516,581 A | 5/1996 | Kreckel | |
| 6,380,497 B1 | 4/2002 | Hashimoto et al. | |
| 6,458,440 B1 | 10/2002 | Merritt | |
| 7,678,318 B2 * | 3/2010 | Line et al. | 264/274 |
| 2001/0000789 A1 | 5/2001 | Kotera et al. | |
| 2007/0031659 A1 * | 2/2007 | O'Leary et al. | 428/354 |

FOREIGN PATENT DOCUMENTS

| | | |
|---|---|---|
| JP | 2005-320229 | 11/2005 |
| KR | 10-0255629 | 5/2000 |
| KR | 10-0442336 | 7/2004 |

\* cited by examiner

*Primary Examiner*—Kat Wyrozebski
*Assistant Examiner*—Daniel Lee
(74) *Attorney, Agent, or Firm*—Kenneth B. Wood

(57) ABSTRACT

Herein are disclosed methods and assemblies for mounting an article to a surface by a double-faced adhesive. At least one spacer is used that is deflectable upon the application of sufficient force. When in a first, undeflected condition, the spacer provides sufficient space between the mounting surface and the double-faced adhesive such that the double-faced adhesive does not contact the mounting surface, thus the position of the article can be adjusted. When in a second, deflected condition, the spacer allows the double-faced adhesive to contact the mounting surface such that a bond can be established between the double-faced adhesive and the mounting surface.

6 Claims, 5 Drawing Sheets

METHODS AND ASSEMBLIES FOR ATTACHING ARTICLES TO SURFACES

BACKGROUND

Adhesives (e.g., pressure-sensitive adhesives) have often found use in attaching articles to surfaces. For example, double-faced adhesive tapes (i.e., tapes bearing adhesive on both major opposing surfaces) are widely known and used. In particular, stretch releasing adhesive tapes have found use in a wide variety of assembling, joining, attaching, and mounting applications.

SUMMARY

Herein is disclosed an assembly comprising an article comprising at least one piece of double-faced adhesive and at least one deflectable spacer. The assembly allows the article to be positioned relative to a mounting surface such that the article can be attached to the mounting surface by the double-faced adhesive. Also disclosed is a method for performing such positioning and/or attaching. The deflectable spacer that is used with the method and assembly can be arranged on the article and is deflectable upon the application of sufficient force to the spacer. When in a first, undeflected condition, the spacer provides sufficient space between the mounting surface and the double-faced adhesive that the double-faced adhesive does not contact the mounting surface. Thus, with the spacer in its undeflected condition the article can be positioned so that the article is in a desired location. Then, sufficient force can be applied to the spacer (e.g., by moving the article toward the mounting surface) that the spacer is deflected into a second, deflected condition that allows an exposed adhesive surface of the double-faced adhesive to contact the mounting surface and to allow a bond to be established between the double-faced adhesive and the mounting surface.

In one embodiment the spacer is deflectable by way of at least a portion of the spacer being compressible. In this embodiment the deflectable spacer may remain in place between the article and the mounting surface, after the article is attached to the mounting surface.

In an alternate embodiment the spacer is deflectable by way of being removable from the article. In this embodiment, when force is applied to the spacer the spacer is removed from the article, thus allowing the double-faced adhesive to come in contact with the mounting surface. In a particular embodiment, the deflectable spacer can be removed as a single piece. In an alternative embodiment, the deflectable spacer comprises at least one breakable portion that will fracture and break upon applied pressure, such that the spacer can be removed piecewise.

The assembly and method described herein may be particularly advantageous in the positioning and attachment of relatively large and/or heavy articles to a mounting surface. In the absence of a deflectable spacer as described herein, such articles can be difficult to position without prematurely contacting the double-faced adhesive with the mounting surface. Another advantage of the assembly and method described herein is that the spacer is deflected in the act of moving the assembly toward the mounting surface in order to attach the article to the mounting surface; that is, a separate, additional operation (to deflect the spacer so that the article can be attached) is not needed.

In one embodiment, the double-faced adhesive used herein is a stretch releasing adhesive.

Thus, in one aspect, herein is disclosed a method of attaching an article to a mounting surface, the method comprising: providing an article comprising, at least one double-faced adhesive bonded to the article, and, at least one deflectable spacer arranged on the article; arranging the article such that at least a portion of the deflectable spacer contacts the mounting surface; positioning the article in a desired location on the mounting surface; and, moving the article toward the mounting surface such that the spacer is deflected into a deflected condition that allows contact between the double-faced adhesive and the mounting surface, and such that the double-faced adhesive contacts the mounting surface and adhesively bonds thereto.

Herein is provided in another aspect an assembly for attaching an article to a mounting surface, comprising: an article comprising at least one bonding surface; at least one double-faced adhesive with first and second oppositely-facing major adhesive surfaces, with the first major adhesive surface being adhesively bonded to the bonding surface of the article; at least one deflectable spacer arranged on the article; wherein the spacer is deflectable at least from a first, undeflected condition to a second, deflected condition, wherein when the spacer is in the first, undeflected condition at least a portion of the deflectable spacer extends outward from the article past the second major adhesive surface of the double-faced adhesive, and wherein when the spacer is in the second, deflected condition, no portion of the deflectable spacer extends outward from the article past the second major adhesive surface of the double-faced adhesive.

Herein is provided in another aspect a kit for attaching an article to a mounting surface, comprising: at least one double-faced adhesive; and, at least one polymeric molded deflectable spacer comprising at least a main body and at least two protruding portions connected thereto, each protruding portion comprising an undercut feature.

These and other aspects of the invention will be apparent from the detailed description below. In no event, however, should the above summaries be construed as limitations on the claimed subject matter, which subject matter is defined solely by the attached claims, as may be amended during prosecution.

Like reference symbols in the various figures indicate like elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", bottom", "upper", lower", "under", "over", "front", "back", "outward", "inward", and "first" and "second" may be used in this disclosure, it should be understood that those terms are used in their relative sense only.

DETAILED DESCRIPTION

Herein is disclosed an assembly comprising an article comprising at least one piece of double-faced adhesive and at least one deflectable spacer. By "deflectable spacer" is meant a spacer that can be arranged on an article in a first, undeflected condition in which the spacer prevents contact between a double-faced adhesive on the article and a mounting surface, and that can also assume a second, deflected condition in which the spacer allows contact between the double-faced adhesive and the mounting surface.

Figure 1:
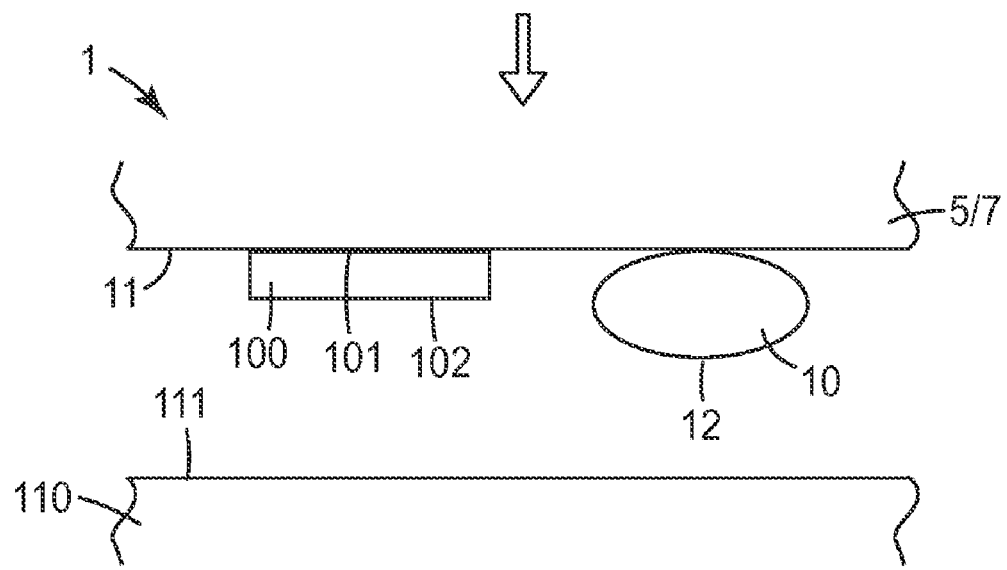
FIG. 1 is a cross sectional view of an article comprising a piece of double-faced adhesive and a deflectable spacer.

Shown in FIG. 1 is a cross-sectional view of an assembly 1 comprising an article 5 that comprises a piece of double-faced adhesive 100 and a deflectable spacer 10. Assembly 1 is shown in proximity to mounting surface 111 of mounting unit 110 (which can be a shelf, a floor, a wall, etc.), to which article 5 can be adhesively attached by the methods disclosed herein.

Article 5 can comprise any article which is desired to be attached to mounting unit 110, and can be made of any desired material or combination of materials. For example, article 5 can comprise a framed decorative object (e.g., a picture or plaque), a receptacle for holding items (e.g., a dishpan, dishrack, storage basket, or hamper) etc. In one embodiment, article 5 comprises a wire-formed article (such as a wire basket) that comprises a plurality of wire members. In one embodiment, article 5 comprises a slide-out product that comprises a main body (such as a receptacle designed to receive items, and which may comprise a wire-formed article) that is slidably supported (e.g. by way of a so-called sliding bearing or glide runner) by one or more support rails. Such systems are often mounted to shelves or other horizontal surfaces.

In one embodiment, article 5 comprises a relatively flat and smooth major surface that comprises a bonding surface 11 capable of receiving the double-faced adhesive, such that the major surface of article 5 can be used to attach article 5 to a mounting surface. Or, article 5 can comprise a mounting plate 7 that is connected to some portion of article 5 and that comprises a bonding surface 11 capable of receiving the double-faced adhesive. If article 5 is a slide-out product, mounting plate 7 can be connected to a support rail of article 5 such that mounting plate 7 is adhesively attachable to a mounting surface by the methods disclosed herein and the main body of article 5 is slidably movable relative to the support rail/mounting plate. A single mounting plate 7, or multiple mounting plates 7, can be used.

Also shown in FIG. 1 is a piece of double-faced adhesive 100. Double-faced adhesive 100 can comprise any suitable sheet, film, layer, etc. that comprises pressure-sensitive adhesive functionality on oppositely-facing major surfaces. Adhesive sheet 100 is configured such that first major adhesive surface 101 can be adhered to bonding surface 11, and such that second major adhesive surface 102 can be exposed (e.g., after removal of a release liner) so as to be adherable to mounting surface 111.

Double-faced adhesive sheet 100 may be supplied to a user already bonded to bonding surface 11; or, sheet 100 may be supplied separately to be adhered to bonding surface 11 by the user. The double-faced adhesive can comprise any suitable adhesive that is available in the form of a sheet, tape, roll good, etc., from which a discrete adhesive sheet piece 100 can be obtained which is suitable for being contacted with and bonded to bonding surface 11 and mounting surface 111. Suitable adhesives thus include double-stick tapes, laminating adhesives, double-faced foam tapes, and the like, as are commonly known in the art.

In a particular embodiment, the double-faced adhesive comprises a stretch release adhesive. Such a stretch release property can allow the adhesive to be securely attached to a surface and to be later removed from the surface without visual disfigurement of, or leaving adhesive residue on, the surface.

A suitable stretch releasing adhesive tape can comprise an elastic backing, or a highly extensible and substantially inelastic backing, with a pressure-sensitive adhesive disposed (e.g. coated) thereupon. Or the tape can be formed of a solid, elastic pressure sensitive adhesive. Thus, in this context, the term "tape" encompasses products that comprise a unitary, integral, or solid construction of adhesive (in addition to products that comprise a backing with separate layers of adhesive residing thereupon). Suitable exemplary stretch releasing tapes are described in U.S. Pat. No. 4,024,312 to Korpman; German Patent No. 33 31 016; U.S. Pat. No. 5,516, 581 to Kreckel et al.; and PCT International Publication No. WO 95/06691 to Bries et al. Such stretch release adhesives can range, for example, from about 0.2 mm in thickness to about 2 mm in thickness. In particular, such stretch release adhesives are often about 1 mm in thickness.

If double-faced adhesive 100 is a stretch-release adhesive, it may comprise a pull tab (e.g., an end of the sheet that does not comprise adhesive), which may be grasped by a user and pulled so as to activate the stretch release properties of the adhesive when it is desired to detach article 5 from mounting surface 111.

A single piece 100 of double-faced adhesive can be used; or, multiple pieces can be used. In use of multiple pieces, the pieces can be attached to a bonding surface portion 11 of a major surface of article 5; or, they can be attached to the bonding surface 11 of a mounting plate 7 which is connected to article 5; or, they can be attached to bonding surfaces 11 of multiple mounting plates 7 which are connected to article 5.

Also shown in FIG. 1 is a generic representation of a deflectable spacer 10. Deflectable spacer 10 provides a mechanism by which article 5 can be placed and maintained in a position such that double-faced adhesive 100 does not contact mounting surface 111, until such time as it is desired to contact adhesive 100 with mounting surface 111. Thus, at least one terminal end 12 of deflectable spacer 10 is positioned outwardly in a direction generally perpendicular to bonding surface 11 of article 5 (that is, in the direction of the arrow in FIG. 1), relative to adhesive surface 102 of double-faced adhesive 100. Thus, upon moving assembly 1 toward mounting unit 110, at least one terminal end 12 of spacer 10 will contact mounting surface 111. In this manner, with spacer 10 in a first, undeflected condition, contact of adhesive surface 102 with mounting surface 111 is prevented, such that article 5 is not prematurely attached to mounting surface 111. Thus, article 5 can be positioned on mounting unit 110 (that is, moved in any direction generally parallel to mounting surface 111), such that article 5 is in a desired location prior to being attached. Applicant notes that in this context, the act of positioning can comprise simply confirming or verifying that article 5 is in a desired location. That is, positioning of article 5 does not necessarily have to involve moving article 5 from the position that it is in when terminal end 12 of spacer 10 contacts mounting surface 111.

In this first, undeflected condition, spacer 10 will prevent contact of adhesive surface 102 with mounting surface 111, until sufficient force is placed upon spacer 10 to deflect spacer 10 so as to allow such contact. Thus, for example, even if article 5 is a relatively heavy object that is placed upon a horizontal surface, spacer 10 is designed such that the weight of article 5 will not cause sufficient deflection of spacer 10 to result in contact of adhesive surface 102 with mounting surface 111.

Upon the application of sufficient force to spacer 10 (typically, by moving article 5 farther toward mounting surface 111, in the direction indicated by the arrow in FIG. 1), spacer 10 is deflected into its deflected condition, which allows adhesive surface 102 of double-faced adhesive 100 to contact mounting surface 111 and an adhesive bond to be established. In various embodiments, spacer 10 can be deflected by way of at least some portion of spacer 10 being elastically compressed, and/or by way of at least some portion of spacer 10 being flexibly deformed, and/or by way of at least some portion of spacer 10 being fractured or plastically deformed, all as described in detail below. In various embodiments, spacer 10 when in its deflected condition can remain in contact with (e.g., attached to) article 5 or a component connected thereto, or can be partially or completely removed from article 5, all as described in detail below.

In one embodiment, a single spacer 10 can be used. In an alternate embodiment (which may be advantageous in the case of relatively large and/or heavy articles), multiple spacers 10 can be used. In such a case spacers 10 can be designed (such as by choice of their properties and/or size, for example) such that when in their undeflected condition, they collectively prevent the one or more double-faced adhesive pieces 100 from contacting mounting surface 111, but when in their deflected condition, they allow such contact.

Deflectable spacer(s) 10 can be arranged on article 5 in any of several ways. In one embodiment, deflectable spacer 10 is held in between article 5 and mounting surface 111 (for example, by the weight of article 5) without being attached to article 5. Such an approach may be useful, for example, in the attaching of article 5 onto the top of a horizontal surface. In alternative embodiments, deflectable spacer 10 can be attached to article 5, either temporarily (e.g., removably) or permanently. Deflectable spacer 10 can be attached to a main body of article 5 (for example, to a major surface of the main body), or can be attached to a component connected thereto (for example, a mounting plate 7 as described above). Deflectable spacer 10 can be attached to article 5 adhesively (e.g., by the use of double-faced adhesive) or mechanically (e.g., by the use of attachment features on spacer 10 and/or article 5), both as described later herein. More specifically, deflectable spacer 10 can be attached to a bonding surface 11 of article 5 (for example by the use of a double-faced adhesive), irrespective of the presence or absence of an edge or opening in article 5 in the vicinity of spacer 10; or, spacer 10 can be attached at a terminal edge of the main body of article 5 or at a terminal edge of a component attached thereto (for example, a mounting plate); or, spacer 10 can be attached at an edge of a feature (such as an opening or hole) on the main body of article 5 or on a component connected thereto. Deflectable spacer 10 can be positioned in close proximity to double-faced adhesive 100 (and, in one embodiment, is attached to the same bonding surface 11 of article 5 as is double-faced adhesive 100, as shown in FIG. 1); or, it can be positioned at some distance from double-faced adhesive 100. All of the above-described approaches and variations are contemplated by the inventor as being within the scope of the invention, as long as spacer (or spacers) 10 performs its desired function.

Figure 2:
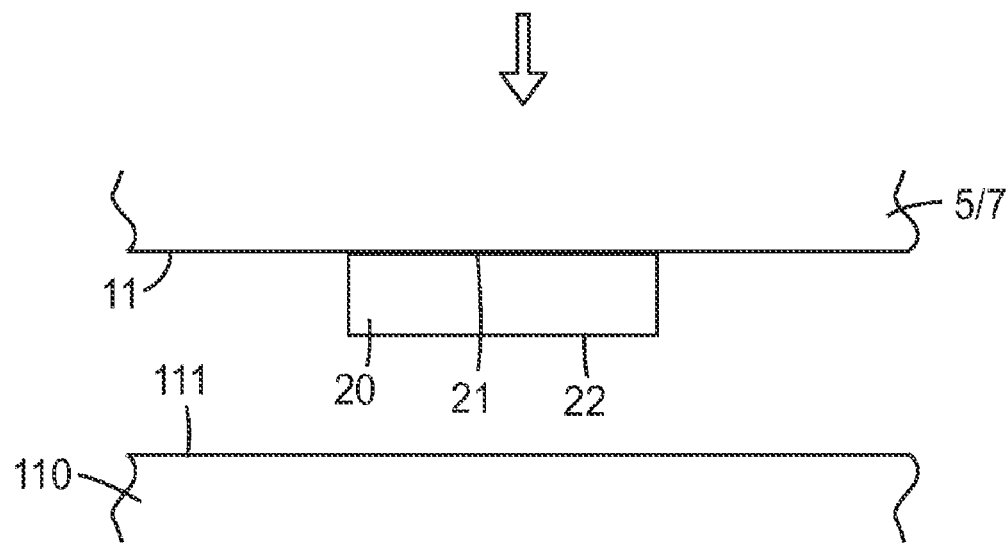
FIG. 2 is cross sectional view of an article with an exemplary compressible spacer.

In one embodiment, deflectable spacer 10 comprises a compressible spacer 20. Such a spacer 20 can be arranged on article 5, attached to article 5 (e.g., by double-faced adhesive) etc., as described above. In such an embodiment (shown in an exemplary manner in FIG. 2), compressible spacer 20, when in a first, relatively uncompressed condition, comprises terminal end 22 (which in the exemplary design of FIG. 2 is a terminal surface). Thus, when article 5 is moved toward mounting unit 110, terminal end 22 of spacer 20 will contact mounting surface 111 and prevent surface 102 of double-faced adhesive 100 from contacting mounting surface 111. Upon application of sufficient force to spacer 20 (typically, by moving article 5 farther toward mounting surface 111, in the direction indicated by the arrow in FIG. 2), spacer 20 will compress sufficiently to place spacer 20 in a deflected condition so as to allow surface 102 of double-faced adhesive 100 (not shown in FIG. 2) to contact mounting surface 111 and an adhesive bond to be established. In this embodiment, compressible spacer 20 may remain in place (e.g., in a compressed condition) after attachment of article 5 to mounting unit 110.

In one embodiment, compressible spacer 20 comprises a material that is compressible primarily by its intrinsic physical properties rather than by its geometric design. Such materials include any material with a suitably low bulk (compression) modulus. Such materials might include for example compressible natural or synthetic polymeric foams such as foam rubber, polyurethane foams and the like; compressible fibrous materials such as nonwoven webs (such as the product available from 3M Company, St. Paul, Minn., under the trade designation Scotch-Brite); etc. The bulk modulus of the material should however not be so low that the compressible spacer (or combination of spacers) in its undeflected (relatively uncompressed) condition fails to keep adhesive surface 102 from contacting mounting surface 111 until the application of sufficient force to the spacer or spacers.

Figure 3:
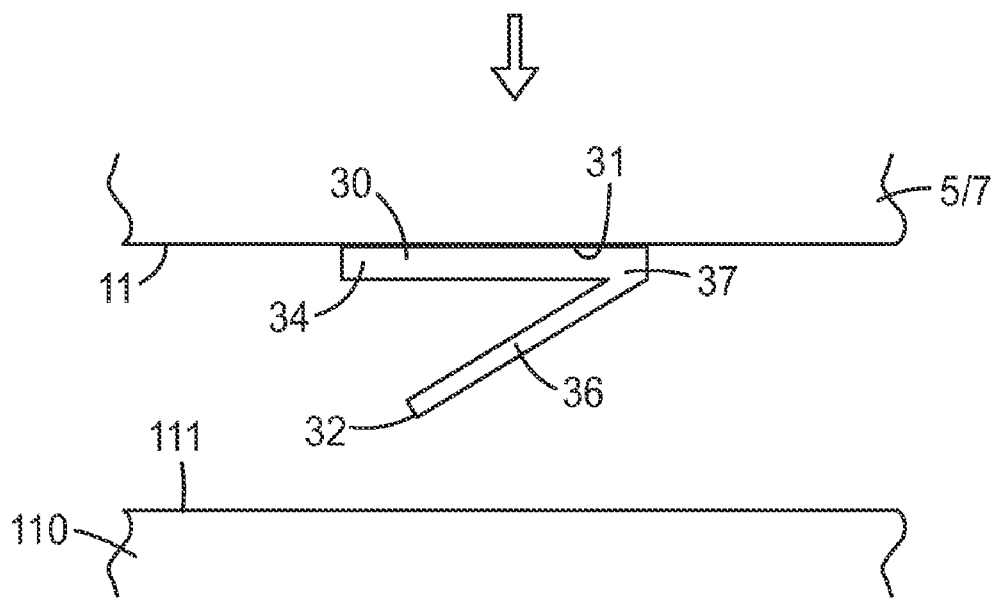
FIG. 3 is a cross sectional view of an article with another exemplary compressible spacer.

In an alternate embodiment (pictured in an exemplary manner in FIG. 3), compressible spacer 30, although not necessarily made of a material with a low bulk modulus, comprises a structure that exhibits compressibility at least partially by way of its geometric design. For example, compressible spacer 30 of FIG. 3 comprises a so-called leaf spring structure, comprising a main body 34 that is attached to article 5 (for example, attached to surface 11 of article 5 by a double-faced adhesive, not shown in FIG. 3). Attached to main body 34 by joint 37 is at least one protruding portion 36 with terminal end 32. Protruding portion 36 protrudes from main body 34 at an angle (often, of between 10 and 60 degrees) from the plane of main body 34. Protruding portion 36 can be flexible (i.e., made of a material that comprises a relatively low flexural modulus, e.g. polyurethane, silicone, natural rubber), and/or joint 37 can comprise a flexible connection between portion 36 and main body 34. For example, joint 37 can comprise a so-called living hinge structure.

When article 5 is moved toward mounting unit 110, terminal end 32 of compressible spacer 30 will contact mounting surface 111 and prevent surface 102 of double-faced adhesive 100 (not shown in FIG. 3) from contacting mounting surface 111. Upon application of sufficient force to spacer 30 (typically, by moving article 5 farther toward mounting surface 111, in the direction indicated by the arrow in FIG. 3), protruding portion 36 will bend along some or all of its length, and/or will bend at joint 37, so as to place spacer 30 in a deflected condition so as to allow surface 102 of double-faced adhesive 100 to contact mounting surface 111 and an adhesive bond to be established.

Figure 4:
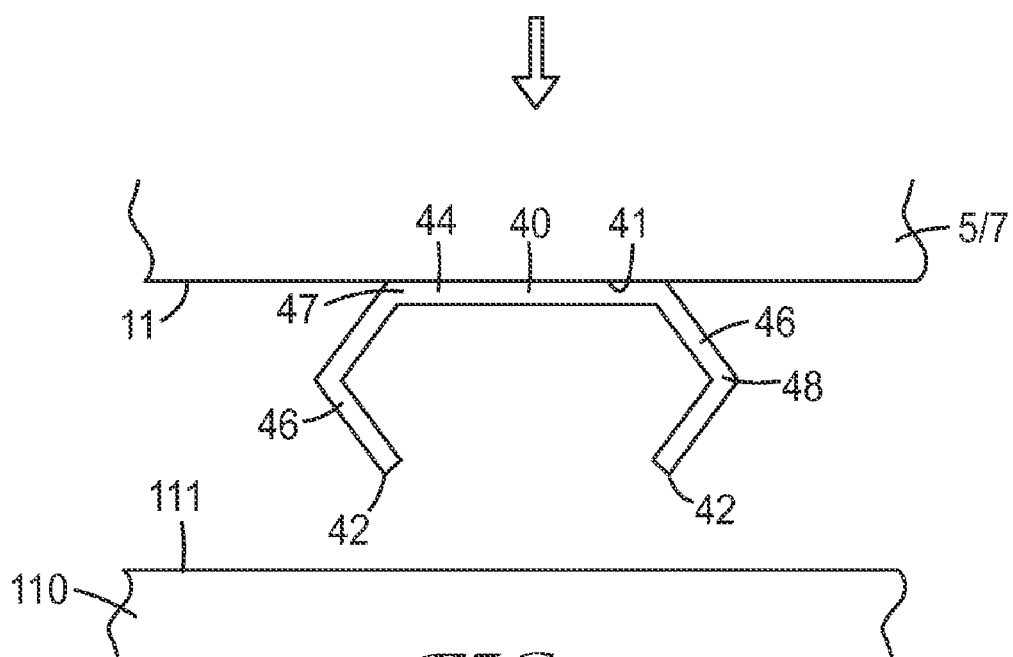
FIG. 4 is a cross sectional view of an article with another exemplary compressible spacer.

In a further embodiment, compressible spacer 40 comprises a design as pictured in FIG. 4. In this design, at least two protruding portions 46 comprising terminal ends 42 are attached to main body 44. With terminal ends 42 in contact with mounting surface 111, upon application of sufficient force to spacer 40, portions 46 can bend along their length, and/or can bend at joints 47 that connect them to main body 44, and/or can bend at elbows 48, so as to place spacer 40 in a deflected condition so as to allow surface 102 of double-faced adhesive 100 (not shown in FIG. 4) to contact mounting surface 111 and an adhesive bond to be established.

Compressible spacers 30 and 40 are but two exemplary designs. Various types, combinations and numbers of protruding elements can be used, and can be attached to any location or portion of the spacer main body by any suitable method. In one embodiment, the compressible spacer is molded as an integral unit. In a specific embodiment, the compressible spacer is a molded polymeric material. Suitable polymeric materials include, for example common injection-moldable materials such as polypropylene, polyethylene, nylon, and blends and copolymers thereof.

It is also noted that a compressible spacer may not be possible to categorize as either compressible solely by way of a low bulk modulus or compressible solely by way of its geometric design. Many materials and designs may make use of both mechanisms. For example, grids, lattices, networks, meshes, honeycombs, corrugated structures, accordionized structures, or pleated structures, etc., of various materials (e.g., plastic, wood, metal) can be used. A hollow structure (e.g., a tube) comprising a flexible plastic or a flexible foam can be used. A coiled spring of plastic or metal can also be used. In summary, any combination of material and geometric design can be used that will provide the desired compressibility.

In an alternative embodiment, spacer 10 is deflectable by way of being removable. In this case, (with reference to FIG. 1) when in a first, undeflected condition spacer 10 comprises a terminal end 12 that, if article 5 is moved toward mounting unit 110, will contact mounting surface 111 and prevent adhesive surface 102 from contacting mounting surface 111. Upon application of sufficient force to spacer 10 (typically, by moving article 5 farther toward mounting surface 111), spacer 10 is removed into a second, deflected condition so as to allow surface 102 of double-faced adhesive 100 to contact mounting surface 111 and an adhesive bond to be established. When in its second, deflected condition, in various embodiments spacer 10 is partially removed from article 5 (such that some part of spacer 10 is still contacting some portion of article 5), or completely removed from article 5 (such that no part of spacer 10 is still contacting any portion of article 5).

Figure 5:
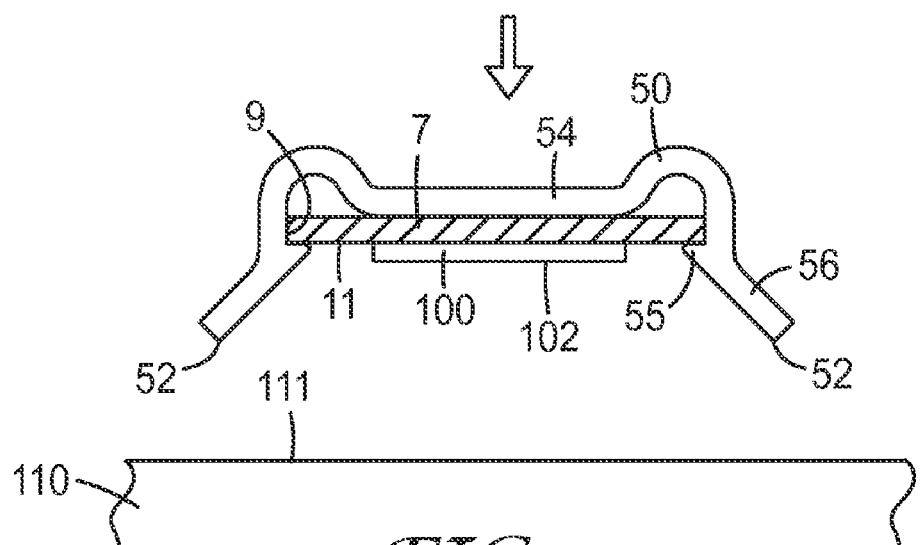
FIG. 5 is a cross sectional view of an article with an exemplary removable spacer.

FIG. 5 shows an exemplary removable spacer 50 in cross section, in a first, undeflected condition snap-fitted onto mounting plate 7 (which is connected to article 5, not shown in FIG. 5). Spacer 50 comprises main body 54 and comprises at least two protruding portions 56 each comprising a terminal end 52, and each connected to and extending outward from main body 54. In one embodiment, protruding portions 56 are designed such that when spacer 50 is attached to mounting plate 7, portions 56 are at an angle of between about 20 and about 70 degrees relative to the plane of mounting plate 7. In a particular embodiment, this angle is between about 30 and about 60 degrees. Spacer 50 also comprises undercut features 55 that are adapted to hold a member (e.g., mounting plate 7) in place between undercuts 55 and main body 54, so as to secure spacer 50 to the member.

Spacer 50 is thus a removable clip that can be mechanically attached (e.g., clipped on, snap-fitted, etc.) to mounting plate 7 and then held in place by undercuts 55 which protrude a short distance laterally inward (i.e., toward the center of plate 7, in a direction parallel to the plane of plate 7) from edges 9 of plate 7 and which contact surface 11 of plate 7. With spacer 50 in this first, undeflected condition, upon moving article 5/mounting plate 7 toward mounting unit 110, terminal ends 52 of spacer 50 will contact mounting surface 111 and prevent adhesive surface 102 of double-faced adhesive 100 from contacting mounting surface 111. Upon application of sufficient force to spacer 50 (by moving article 5/mounting plate 7 farther toward mounting surface 111, in the direction indicated by the arrow in FIG. 5) portions 56 will move laterally outward so that undercuts 55 are released from edges 9 of mounting plate 7 with the result that spacer 50 is no longer attached to plate 7 and is thus in a second, deflected condition which allows adhesive surface 102 to be contacted with mounting surface 111.

Spacer 50 can comprise one or more arcuate regions (as shown in FIG. 5) to provide for an increased ease of moving portions 56 laterally outward. Although shown as relatively sharp in FIG. 5, terminal ends 52 can be rounded, or can comprise relatively flat surfaces that are oriented generally parallel to mounting surface 111 when brought into contact with mounting surface 111. Such designs may serve to prevent damage to mounting surface 111 if, upon application of force to spacer 50, terminal ends 52 move laterally across mounting surface 111. Such a design may be particularly useful if mounting surface 111 is fragile, easily damaged, decorative, etc. (Similar considerations apply for the other spacer designs mentioned herein).

In the exemplary design of FIG. 5, double-faced adhesive 100 is shown as attached to surface 11 of mounting plate 7, such that when spacer 50 is placed in its first, undeflected position upon mounting plate 7, double-faced adhesive 100 is in between undercuts 55 of spacer 50. Double-faced adhesive can also be placed in other locations on article 5.

Figure 6:
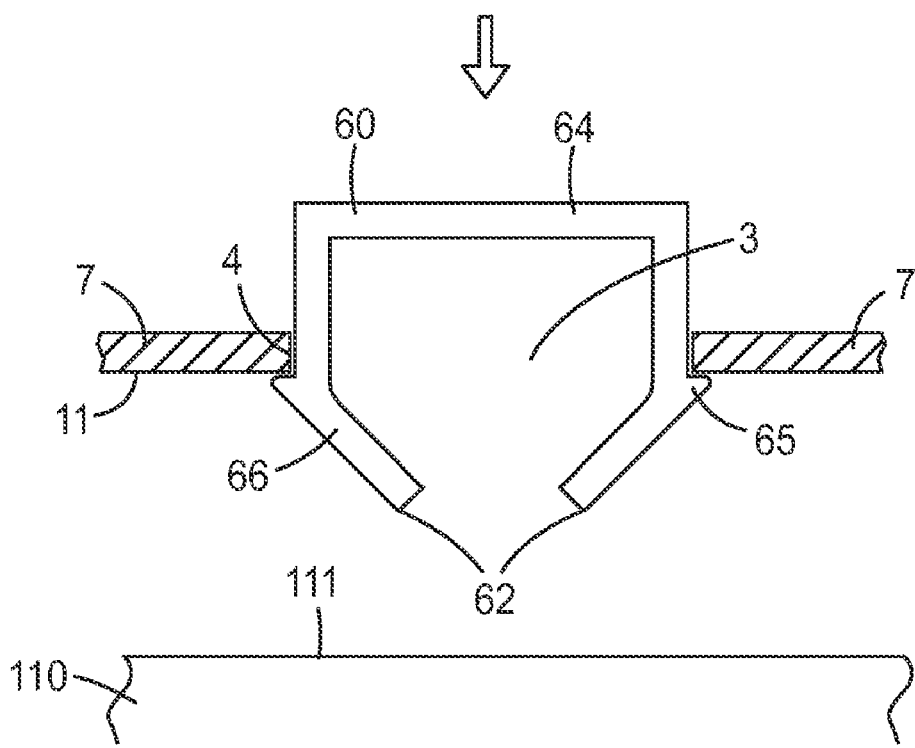
FIG. 6 is a cross sectional view of an article with another exemplary removable spacer.

FIG. 6 shows an alternative design of an exemplary removable spacer 60 in cross section, in a first, undeflected condition snap-fitted into mounting plate 7. Rather than being designed to clip on or snap fit onto opposing edges of mounting plate 7 (as in the design of FIG. 5), in this design spacer 60 is configured to clip in or snap fit within the edges of an opening (e.g. a through-hole) 3 in mounting plate 7 and to be held in place by way of undercuts 65 which protrude a short distance laterally outward (i.e., away from the center of opening 3 in plate 7, in a direction parallel to the plane of plate 7) from edges 4 of opening 3 in plate 7, and which contact surface 11 of plate 7. Spacer 60 of FIG. 6 thus comprises a main body 64 that can be generally U-shaped, horseshoe-shaped, etc. in cross section, and further comprises (at least) two protruding portions 66 each comprising a terminal surface 62, each protruding portion 66 extending laterally inward (toward the centerline of main body 64), and each protruding portion 66 connected to main body 64 as shown. In one embodiment, protruding portions 66 are designed such that when spacer 60 is attached to mounting plate 7, portions 66 are angled at between about 20 and about 70 degrees relative to the plane of mounting plate 7. In a particular embodiment, this angle is between about 30 and about 60 degrees. If desired, spacer 60 can also comprise features (e.g., overhang features, not shown in FIG. 6) that can assist in keeping spacer 60 in place on article 5 (in its undeflected condition), until such time as it is desired to deflect spacer 60.

With this design, application of sufficient force to spacer 60 toward mounting surface 111 (by moving article 5/mounting plate 7 toward mounting surface 111, in the direction marked by the arrow in FIG. 6) will result in portions 66 deflecting laterally inward so that undercuts 65 are released from edges 4 of mounting plate 7 with the result that spacer 60 is no longer attached to plate 7. Adhesive surface 102 (not shown in FIG. 6) can then be contacted with mounting surface 111. (In this process spacer 60 may be pushed upward through opening 3).

Figure 7:
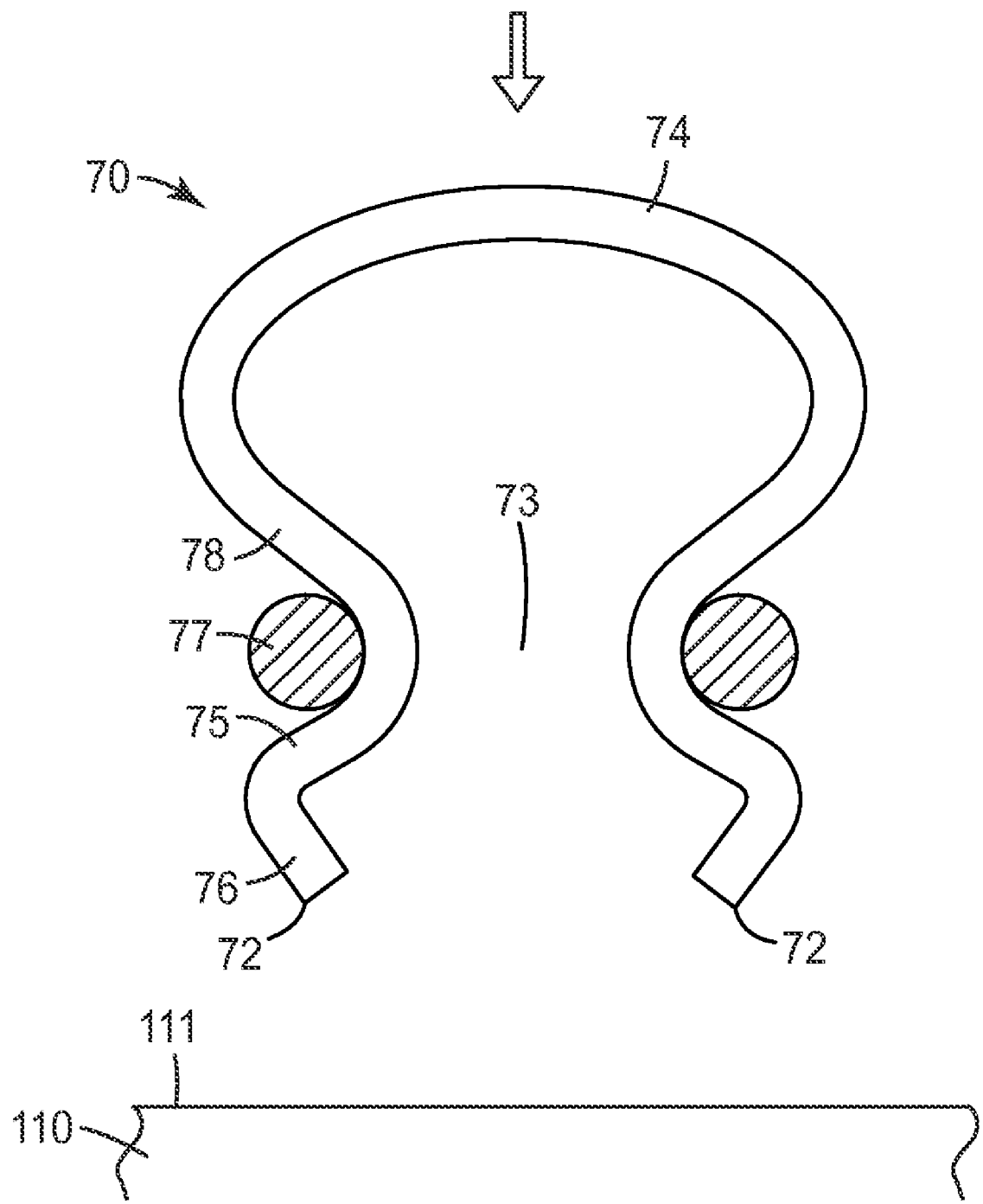
FIG. 7 is a cross sectional view of an article with another exemplary removable spacer.

FIG. 7 shows an alternative design of an exemplary removable spacer 70 in cross section, in a first, undeflected condition snap-fitted onto article 5. In this instance article 5 comprises a wire-formed article (e.g., a basket) that comprises a plurality of wire members 77. In this design spacer 70 is configured to clip in or snap fit between two adjacent generally parallel wire members 77 of article 5 and to be held in place by the combination of undercuts 75 that protrude a short distance under wire member 77 and overhangs 78 that protrude a short distance over wire member 77. Spacer 70 of FIG. 7 thus comprises a main body 74 that can be generally U-shaped, horseshoe-shaped, etc. in cross section, with two protruding portions 76 each comprising a terminal surface 72, each extending laterally inward (toward the centerline of main body 74), each connected to main body 74 as shown and each comprising undercuts 75 and overhangs 78. In one embodiment, protruding portions 76 are designed such that when spacer 70 is attached to wire-formed article 5, portions 76 are angled at between about 20 and about 70 degrees relative to the plane established by wires 77 to which spacer 70 is attached. In a particular embodiment, this angle is between about 30 and about 60 degrees.

With this design, application of sufficient force to spacer 70 toward mounting surface 111 (by moving article 5 toward mounting surface 111, in the direction marked by the arrow in FIG. 7) will result in portions 76 deflecting laterally inward so that undercuts 75 are released from wires 77 with the result that spacer 70 is no longer attached to article 5. Adhesive surface 102 (not shown in FIG. 7) can then be contacted with mounting surface 111. (In this process spacer 70 may be pushed upward through opening 73).

Applicant notes that while exemplary illustrations herein show deflectable spacers that are symmetric about a centerline in a cross sectional view, and/or that have two protruding portions (36/46/56/66/76), other embodiments are contemplated. For example, deflectable spacers that are not symmetric about a centerline in a cross sectional view, and/or that have more than two protruding portions can be used. Such spacers might comprise, for example, three or more protruding portions extending from a round or circular main body.

Figure 8:
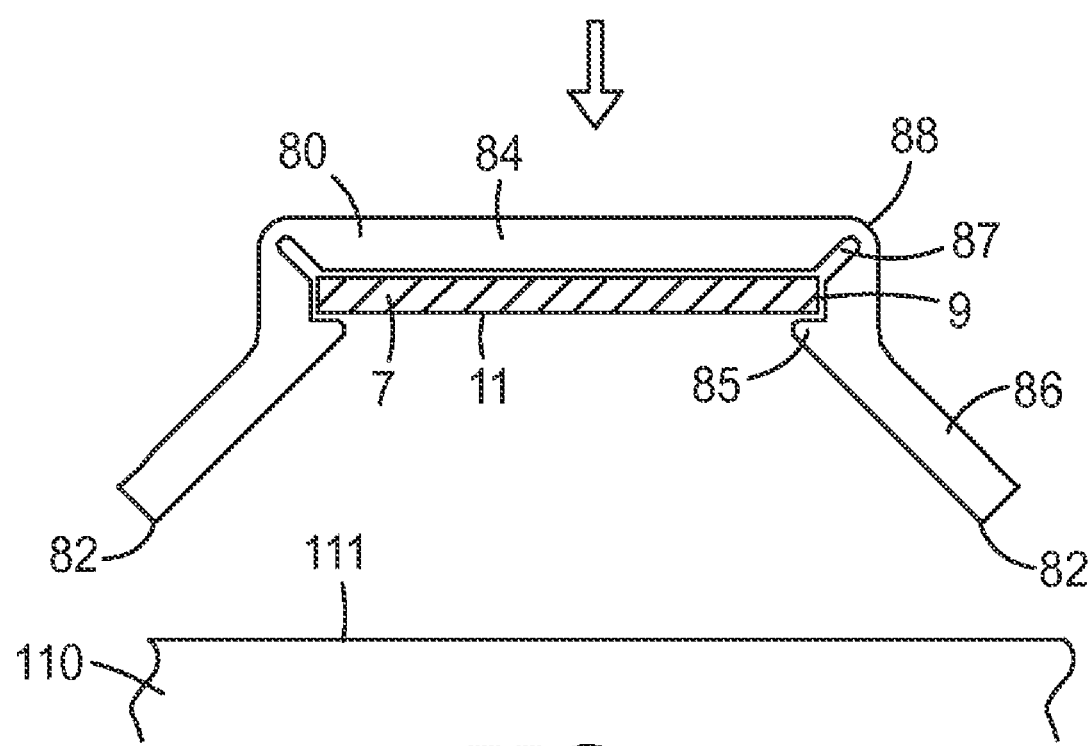
FIG. 8 is a cross sectional view of an article with another exemplary removable spacer.

In the embodiments of FIGS. 5 and 6, spacer 50 (or 60) is removable from mounting plate 7 as one intact piece (which can be reused or used for other purposes). In an alternative embodiment, deflectable spacer 10 comprises a removable break-away clip that is removable by being broken (e.g., fractured) into at least two separate pieces by the application of force. One exemplary breakaway spacer 80 is shown in FIG. 8. In this configuration, spacer 80 comprises a structure (typically, a molded structure) that includes a cavity 87 that provides an area of weakness (i.e., by providing relatively thin section 88) such that, upon applying force to spacer 80 (typically, by moving article 5/mounting plate 7 toward mounting surface 111, in the direction indicated by the arrow in FIG. 8), spacer 80 fractures at weak portion 88 adjacent cavity 87, such that protruding portions 86 (including undercuts 85 and terminal ends 82) break off from main body 84. With protruding portions 86 so removed, spacer 80 is in a deflected condition such that double-faced adhesive 100 (not shown in FIG. 8) can be contacted with mounting surface 111. In such an embodiment, in which protruding portions 86 are designed to break completely apart from main body 84, it may be useful to use a somewhat brittle material for spacer 80 such that brittle fracture occurs.

In an alternate embodiment, spacer 80 can be designed such that, upon application of force, plastic deformation (rather than brittle fracture) occurs in areas of weakness 88, such that protruding portions 86 do not break completely apart from main body 84. Rather, portions 86 may stay attached to main body 84 by way of portions 88, but are plastically deformed so as to move sufficiently far from their initial position such that undercuts 85 release such that spacer 80 is removed into a deflected condition such that double-faced adhesive 100 (not shown in FIG. 8) can be contacted with mounting surface 111.

A number of embodiments of the invention have been described. Nevertheless, it will be understood that various modifications may be made without departing from the invention. For example, it is noted that various combinations of the above-described approaches are possible and that certain embodiments may not fall neatly into specific categories. All such variations and combinations are contemplated by the inventor as being within the bounds of the conceived invention. That is, any combination of a material and a geometric design that results in elastic deformation, plastic deformation, brittle fracture, and/or any combination of such processes, can be used, as long as the desired deflectable spacer is achieved. Thus in summary, various deflectable spacers that may comprise deformability, compressibility, flexibility, crushability, breakability, removability, or some combination of any or all of these properties, are within the bounds of the conceived invention. Accordingly, all such embodiments are within the scope of the following claims.

What is claimed is:

1. An assembly for attaching an article to a mounting surface, comprising:
   an article comprising at least one bonding surface;
   at least one double-faced adhesive with first and second oppositely-facing major adhesive surfaces, with the first major adhesive surface being adhesively bonded to the bonding surface of the article;
   at least one deflectable spacer arranged on the article;
   wherein the spacer is deflectable at least from a first, undeflected condition to a second, deflected condition,
   wherein when the spacer is in the first, undeflected condition at least a portion of the deflectable spacer extends outward from the article past the second major adhesive surface of the double-faced adhesive, and
   wherein when the spacer is in the second, deflected condition, no portion of the deflectable spacer extends outward from the article past the second major adhesive surface of the double-faced adhesive.

2. The article of claim 1 wherein the deflectable spacer is chosen from the group consisting of a compressible foam, a compressible nonwoven, a compressible coiled spring, and a compressible leaf spring.

3. The article of claim 1 wherein the deflectable spacer is a removable clip that when in its first, undeflected condition is mechanically attached to the article.

4. The article of claim 1 wherein the deflectable spacer is a breakable clip that when in its first, undeflected condition is mechanically attached to the article.

5. The article of claim 1 wherein the article comprises at least one mounting plate connected thereto and comprising the bonding surface of the article, wherein the piece of double-faced adhesive is attached to the bonding surface of the mounting plate, and, wherein when in the first, undeflected condition, the deflectable spacer is attached to the mounting plate.

6. The article of claim 1 wherein the double-faced adhesive is a stretch release adhesive.

* * * * *